United States Patent [19]

Gaffey et al.

[11] Patent Number: 4,766,984
[45] Date of Patent: Aug. 30, 1988

[54] NONLINEAR VIBRATION ABSORBER

[75] Inventors: Troy M. Gaffey; David L. Kidd, both of Arlington; Michael L. Grimes, Fort Worth, all of Tex.

[73] Assignee: Bell Helicopter Textron Inc., Fort Worth, Tex.

[21] Appl. No.: 553,426

[22] Filed: Nov. 21, 1983

Related U.S. Application Data

[63] Continuation of Ser. No. 306,698, Sep. 29, 1981, abandoned.

[51] Int. Cl.⁴ .................. F16F 7/10; B64C 27/00; F16M 13/00; B60G 11/52
[52] U.S. Cl. .................. 188/380; 244/17.27; 248/559; 248/636; 267/33; 267/136
[58] Field of Search .................. 188/378–380; 267/8 R, 8 D, 33, 136, 140, 140.2, 140.4, 141.3, 150; 244/17.27, 17.11; 114/122, 124; 248/559, 562, 636; 280/112 D

[56] References Cited

U.S. PATENT DOCUMENTS

| | | | |
|---|---|---|---|
| 989,958 | 4/1911 | Frahm | 188/380 |
| 2,534,963 | 12/1950 | Fowler | 188/379 |
| 3,155,855 | 11/1964 | Fütterer | 267/150 |
| 3,322,379 | 5/1967 | Flannelly | 188/378 |
| 3,977,700 | 8/1976 | Leaf | 267/33 |
| 4,030,573 | 6/1977 | Buzzi et al. | 188/380 |
| 4,365,770 | 12/1982 | Maro et al. | 244/17.27 |

FOREIGN PATENT DOCUMENTS 2903856 8/1979 Fed. Rep. of Germany ...... 188/380

Primary Examiner—Andres Kashnikow
Assistant Examiner—Robert J. Oberleitner
Attorney, Agent, or Firm—Richards, Harris, Medlock & Andrews

[57] ABSTRACT

A vibration absorber is provided having a pendulum (12) mounted on a body (21) for oscillation about an axis (13). A pair of resilient members (14, 15) are mounted on the body (21) in contact with the pendulum (12) in preloaded opposed relation with respect to oscillation of the pendulum (12) about the axis (13) and resonant at the frequency of the vibration. A pair of resilient members (16, 17) are mounted on the body (21) to contact the pendulum (12) only upon oscillation of magnitude beyond a predetermined limit.

7 Claims, 2 Drawing Sheets

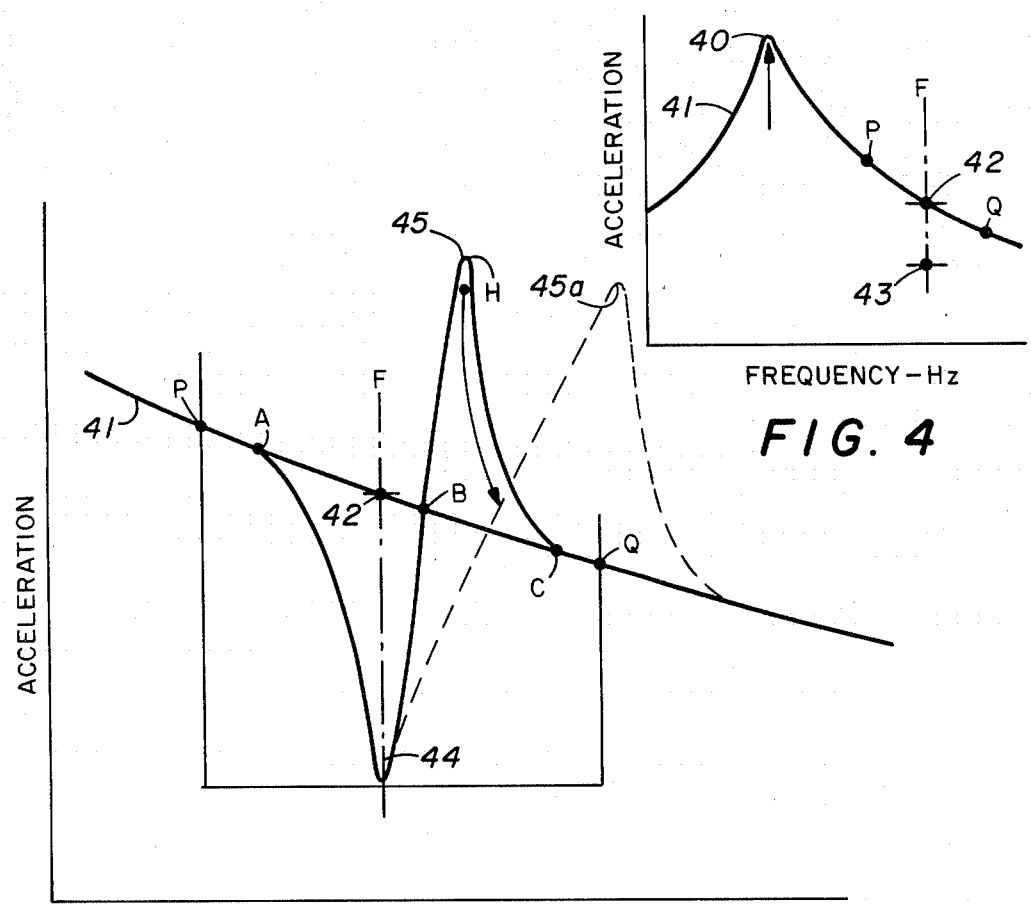
FIG. 4
FIG. 5
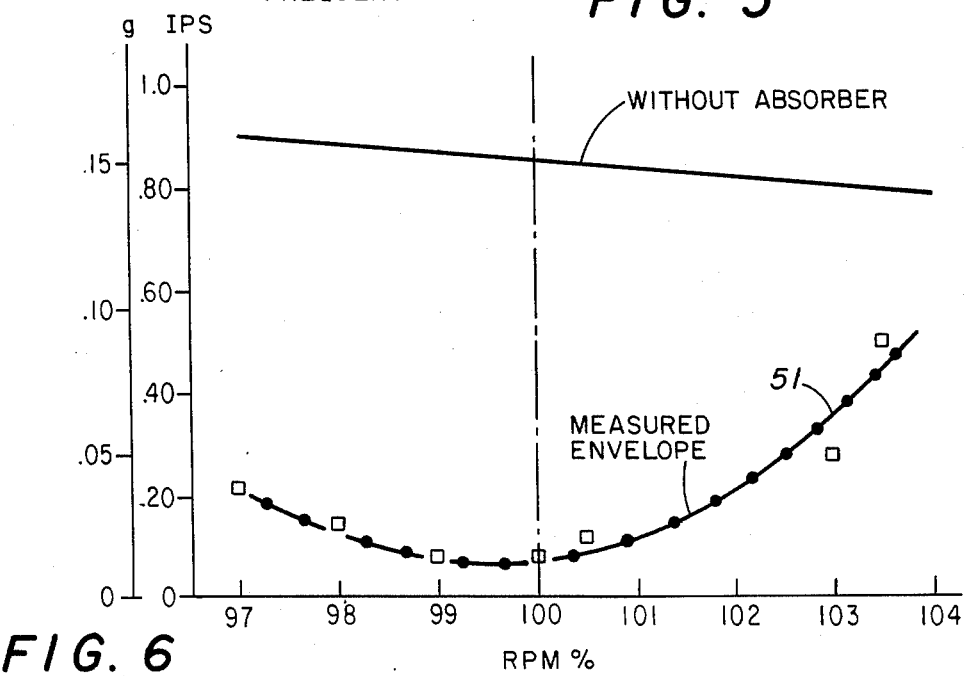
FIG. 6 ized and if tuned to the same frequency as the vibration in the body to which it is secured may cause the vibratory motion of the body to be suppressed.

NONLINEAR VIBRATION ABSORBER

This application is a continuation of application Ser. No. 306,698, filed Sept. 29, 1981, now abandoned.

TECHNICAL FIELD

This invention relates to absorption of vibrations in aircraft and, more particularly, to the provision of the nonlinear means for extending the frequency range of operation.

BACKGROUND ART

Vibration absorbers have been effectively employed to reduce vibrations of a system or body. If a body is forced to vibrate at a frequency $\omega_1$, an absorber $k_2$, $W_2$, tuned to the same frequency of $\omega_1 = \sqrt{k_2 g / W_2}$, introduce an opposing force equal to that of the disturbing force to suppress completely the vibratory motion of the body. Such absorbers are in wide use and generally are well known as FRAHM absorbers.

In such systems, a mass is suspended or connected to a vibrating body by a spring and the spring-mass system will have a resonant frequency of its own and if tuned to the same frequency as the vibration in the body to which it is secured may cause the vibratory motion of the body to be suppressed.

Such systems are of particular interest in the construction and operation of helicopters wherein many vibratory modes must be contended with. For example, of interest is the suppression of lateral vibration of the aircraft fuselage in its first lateral natural mode in response to rotor excitation. Helicopters are designed to operate the rotor system at a substantially constant normal operating speed of, for example, 348 RPM. This frequency of 5.8 Hertz is preferably displaced on a frequency scale from a natural frequency of the fuselage. FRAHM dampers thus installed on the aircraft are usually designed to absorb vibrations at multiple harmonics of the frequency of operation of the rotor system. However, the rotor system may not always operate at precisely the same frequency and it is therefore desirable to provide for absorbtion of unwanted vibration over a substantial frequency range.

DISCLOSURE OF THE INVENTION

In accordance with the present invention, an absorber is provided which comprises a pendulum mounted on a vibrating body and hinged to oscillate about an axis perpendicular to the direction of vibration of the body. A first pair of resilient members are mounted on the body in preloaded opposed relation with respect to oscillation of the pendulum about its axis and resonant at the frequency of vibrations. A second pair of resilient members are mounted to contact the pendulum only at oscillation magnitudes beyond a predetermined limit to prevent amplification of body motion by moving the coupled frequency of the body and absorber system so that the resonance between the varying frequency or excitation and the natural frequency is obviated.

BRIEF DESCRIPTION OF THE DRAWINGS

For a more complete understanding of the present invention, reference may now be had to the following description taken in conjunction with the accompanying drawings in which:

FIG. 4 is a graph showing fuselage acceleration is a function of rotor speed;

FIG. 5 illustrates the function achieved utilizing the present invention; and

FIG. 6 further illustrates the results of use of the invention.

DETAILED DESCRIPTION

Figure 1:
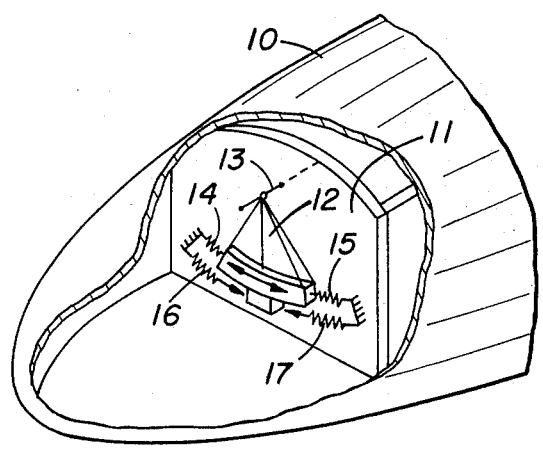
FIG. 1 is a diagrammatic representation of an installation of the present invention to absorb lateral vibrations of a helicopter fuselage.

FIG. 1 illustrates a nose section 10 of a helicopter wherein a vertical bulkhead 11 extends laterally across the nose section. A pendulum 12 is mounted for oscillation laterally with respect to the axis of the nose section 10. The pendulum 12 is mounted for oscillation about axis 13.

Springs 14 and 15 are mounted in a preloaded opposed relationship with respect to the oscillation of the pendulum 12 and thus contact at one end suitable fixed structure on the frame of the aircraft and the pendulum 12 at the other end. Each of springs 14 and 15 contacts opposed faces of the pendulum 12.

In accordance with the present invention, secondary springs 16 and 17 are mounted to be contacted by the pendulum 12 only when the oscillations of the pendulum exceed in magnitude predetermined preset limits.

As will be further explained, the utilization of the secondary springs 16 and 17 serves to enhance the frequency absorption characteristic of the damper system.

Figure 2:
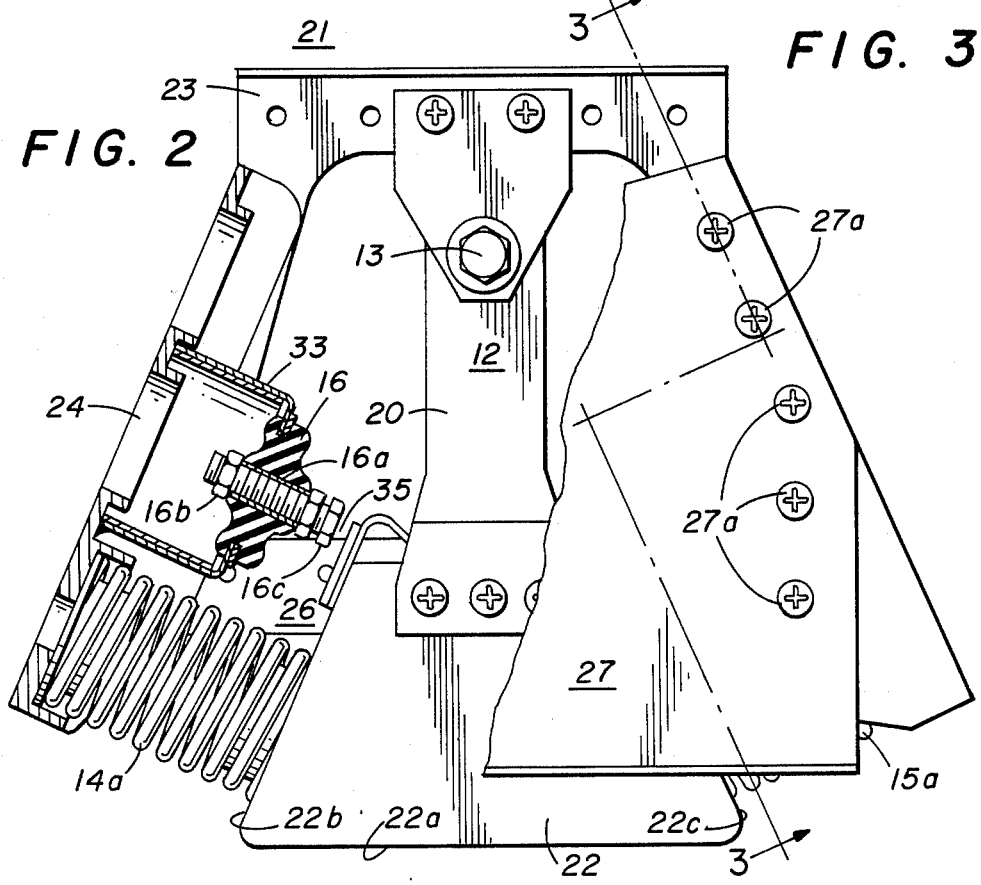
FIG. 2 is a frontal view of a vibration absorber of the type illustrated in FIG. 1.

Referring now to FIG. 2, pendulum 12 comprises an arm 20 which is pivotally mounted on a frame 21 for rotation about pivotal axis 13. A weight portion 22 is secured to the pendulum arm 20 at the lower end thereof. Frame 21 is comprised of back plate 23, left and right descending channel members 24 and 25, respectively, and a lower horizontal cross member 26. Channel member 25 (FIG. 3) comprises a web 25a in which the pad 36 is mounted and flanges 25b and 25c at right angles to web 25a. A cover plate 27 serves to couple the channel members 24 and 25 together leaving the interior open to accommodate the pendulum arm 20 and its attached weight 22.

The weight 22 has a horizontal bottom surface 22a and sloping sidewall surfaces 22b and 22c which are radial relative to axis 13. The sidewalls 22b and 22c generally are parallel to the walls of the channel members 24 and 25, respectively.

Resilient coil spring units 14 and 15 are nested in the lower ends of the frame channels 24 and 25, respectively, and are canted at an angle such that they are perpendicular to the channel members 24 and 25 as well as to the faces 22b and 22c of the weight 22. Springs 14 and 15 are preloaded so that they will oppose oscillating movement of the weight 22 relative to the frame.

In accordance with the present invention, auxiliary springs 16 and 17 are mounted on frame members 24 and 25, respectively, and are positioned to make contact with the weight 22 when the oscillation of the pendulum 12 exceeds a predetermined limit.

Figure 3:
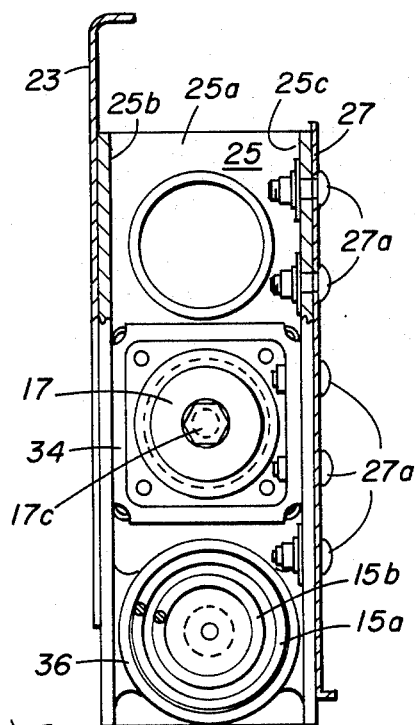
FIG. 3 is a sectional view taken along the lines 3—3 of FIG. 2.

Referring simultaneously to FIGS. 2 and 3, the auxiliary springs 16 and 17 are in the form of elastomeric spools circular in shape and mounted in the mouth of mounting brackets 33 and 34. Brackets 33 and 34 are secured to channel members 24 and 25, respectively. The perimeters of the springs 16 and 17 are secured or adhered to a circular opening in brackets 33 and 34. A central metallic sleeve, such as sleeve 16a, extends through each elastomeric spool. A bolt 16b extends through sleeve 16a and has nuts on both ends so as to be adjustable. The spacing 35 between the head 16c of bolt 16b and the confronting face of the weight 22 thus can be selected.

Spring units 14 and 15, in the form shown, each comprise two coaxial springs. More particularly, spring unit 15 comprises an outer coil spring 15a and an inner coil spring 15b mounted coaxially and both contacting the frame web 25a at one end and at the other end the confronting face 22b of the weight 22. The spring rates of the springs comprising units 14 and 16 can be selected in order to select the natural resonant frequency of the absorber unit.

FIG. 3 is a sectional view taken along lines 3—3 of FIG. 2 and illustrates the channel member 25 with the cover plate 27 secured to flange 25c bolts 27a. The rectangular mounting bracket 34 which serves to mount the auxiliary spring 17 is shown with the central bolt extending therethrough and having the head 17c thereof facing inward for contact with the sloping face 22c of the weight 22, FIG. 2.

A pad 36 is mounted on the lower end of the frame channel 25 with an outer annular surface provided therein to receive the end of the outer spring 15a of unit 15. A smaller nested inner spring is received in the central well of pad 36. Spring unit 14 is similarly mounted.

In accordance with the present invention, the absorber unit of FIGS. 2 and 3 is mounted by suitable means to structure such as a bulkhead 11, FIG. 1 to produce effects of the type reflected in the graphs of FIGS. 4–6.

FIG. 4 illustrates in the frequency domain the response of the fuselage in its first lateral frequency mode of vibration. The fuselage and associated components normally would be constructed so that the first lateral frequency of vibration represented by the peak 40 in curve 41 would be offset downscale from the frequencies of interest; in this example, F is twice the rotor operating speed. Without a vibration absorber, the output acceleration measured in terms of gravity would be at the intersection of the vertical line F and the high frequency skirt of the curve 41. It is desired to reduce the magnitude of the accelerations from the relatively high level of point 42 to a low level point such as at 43. This is accomplished by utilizing an absorber of the present invention having its principal resonance at frequency F.

FIG. 5 is a magnification of range PQ of FIG. 4 on an expanded scale. Installation of an absorber causes the resonance curve 41 to be modified principally between points A and C FIG. 5 with a deep trough 44 occurring at frequency F between points A and B followed by a high peak 45, point H, at a frequency above F and then an asymptotic return to curve 41 at point C above frequency F.

In accordance with the present invention, the auxiliary springs 16 and 17 are employed to permit retention of the deep trough 44 but, at the same time, to shift the frequency of the high peak 45 upscale to a point represented by point 45a. By this means, the frequency response of the damper system is made nonlinear so that excursions of rotor speeds above frequency F will not generate undesired responses as represented by the high peak 45 since it is shifted upscale beyond the normal range of rotor speed variations expected in operation of a rotor system.

In FIG. 6, the performance of the absorber as above described has been further illustrated. The curve 41 represents the response of the system such as shown in FIGURE 1-3 without an absorber present. The curve 51 represents the actual response measured in a helicopter installation where the absorber was mounted in the general orientation shown in FIG. 1 and where measurements of acceleration were taken at the location of the pilot's heel. The effect was to substantially broaden the operating range. As illustrated in FIG. 6, the desired results have been substantially exceeded.

The invention has been described in terms of an absorber for control of the first lateral frequency mode in a helicopter. It is to be understood that the nonlinear absorber of the present invention may be mounted in an aircraft or other vibrating body in other configurations to absorb the vibrations in other modes and extend the available operating range.

In a representative embodiment of the invention, the pendulum had a length of about 6.25 inches from the center axis 13 to the center of mass of the pendulum. The total mass of the pendulum was about 25 pounds. The spring units 14 and 15 each comprised an outer coil spring having a spring rate of about 120 pounds per inch. Nested inside of each outer spring was an inner coil spring having a spring rate of about 35 pounds per inch. The bumper springs 16 and 17 had a spring rate of about 300 pounds per inch. The gap 35 of FIG. 2 was made adjustable to control the magnitude of the departure of the response curve of FIG. 5 above the frequency F, in effect, eliminating the peak response 45 without disturbing the notch 44.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A vibration absorber which comprises:
   (a) a pendulum mounted on a frame for oscillation about an axis and having radially divergent surfaces relative to said axis on the end thereof opposite said axis;
   (b) a first pair of springs mounted on said frame and in contact with said surfaces in preloaded opposed relation with respect to oscillation of said pendulum about said axis and to fix the resonant frequency of said pendulum; and
   (c) a second pair of resilient members mounted on said frame to contact said pendulum only and oppose oscillation thereof beyond a predetermined limit to reduce accelerations of said frame at frequencies above said resonant frequency.

2. A vibration absorber comprising:
   (a) a pair of channel members each having a web and front and rear flanges;
   (b) a rear plate connected to the rear flanges of said channel members to support them in opposed facing divergent relation;
   (c) a pendulum mounted for oscillation on an axis located in the region of convergence of said channel members and having divergent surfaces facing the webs of said channels;

(d) spring means mounted in each of said channels and contacting said surfaces of said pendulum in opposed preloaded relation;

(e) a pair of resilient bodies mounted in said channels, one on each side of said pendulum and facing said surfaces of said pendulum for contact by said pendulum when oscillation thereof exceeds a predetermined limit; and (f) a cover plate secured to the front flanges of said channel members.

3. A vibration absorber which comprises:

(a) structure including a pair of channel members in opposed facing downwardly divergent relation;

(b) a pendulum mounted on said structure having downwardly divergent upper surfaces facing the interior of said channels;

(c) conpression springs mounted in each of said channels and contacting said upper surfaces of said pendulum in opposed preloaded relation;

(d) a pair of resilient bodies mounted on opposite sides of said pendulum and facing said surfaces of said pendulum for contact by said pendulum when oscillation thereof exceeds a predetermined limit; and (e) means for mounting said absorber with the axis of oscillation of said pendulum perpendicular to the direction of vibrations to be absorbed.

4. A vibration absorber comprising:

(a) a pair of channel members;

(b) a rear plate supporting said channel members in opposed facing downwardly divergent relation;

(c) a pendulum mounted on said rear plate having downwardly divergent upper surfaces of said pendulum facing the interior of said channel members;

(d) compression springs mounted in each of said channel members and contacting said upper surfaces of said pendulum in opposed preloading relation;

(e) a pair of resilient bodies mounted on opposite sides of said pendulum and facing said upper surfaces of said pendulum for contact by said pendulum when oscillation thereof exceeds a predetermined limit;

(f) a cover plate secured to the front surfaces of said channel members; and (g) means for mounting said absorber on a vibrating body with the axis of oscillation of said pendulum perpendicular to the direction of vibrations to be absorbed.

5. A vibration absorber comprising:

(a) a pendulum mounted on a pivot shaft and having divergent surfaces the planes of which are in radial relation to the axis of said shaft to present outwardly facing radial surfaces;

(b) a housing structure supporting said shaft and encompassing said pendulum;

(c) a first pair of springs mounted on said housing structure and on opposite sides of said pendulum in aligned opposed tangent relation and contacting said opposed surfaces of said pendulum to oppose rotation of said pendulum on said shaft;

(d) a second pair of springs mounted on said housing structure in aligned opposed tangent relation and confronting said surfaces of said pendulum but in spaced relation and adapted to contact said pendulum when oscillation thereof exceeds a predetermined limit, and (e) means for mounting said absorber on a vibrating body with the axis of said shaft perpendicular to the direction of motion of vibrations to be absorbed.

6. A vibration absorber which comprises:

(a) a wedge shaped pendulum adjusted to be pivotally mounted at its apex on an axis perpendicular to the direction of vibration of a host vibrating body;

(b) a rigid housing for said pendulum adjusted to be mounted on said body having fixed opposed faces interiorly confronting opposite radial faces of said pendulum;

(c) a first pair of resilient members mounted between each side of said pendulum contacting said pendulum and said housing in pre-loaded opposed relation with respect to oscillation of said pendulum about said axis, said pendulum being resonant at the frequency of said vibrations as mounted on said body; and (d) a second pair of resilient members mounted on said housing to contact said pendulum on opposite faces thereof only upon oscillation in said housing of magnitude beyond a predetermined limit.

7. A vibration absorber which comprises:

(a) a wedge shaped pendulum pivotally mounted at its apex on a vibrating body with the pivot and axis perpendicular to the vibration of said body;

(b) a rigid housing for said pendulum having fixed opposed faces confronting surfaces of said pendulum.

(c) a first pair of resilient members, one mounted between each side of said pendulum axis and housing in preloaded opposed relation with respect to oscillation of said vibration; and (d) a second pair of resilient members mounted on said body to contact said pendulum only upon oscillation of magnitude beyond a predetermined limit.

* * * * *